3,189,899
CONTINUOUS WAVE RADAR SYSTEMS
Arthur B. Slater, Lexington, Mass., assignor to Raytheon Company, Lexington, Mass., a corporation of Delaware
Filed Apr. 30, 1958, Ser. No. 733,229
9 Claims. (Cl. 343—14)

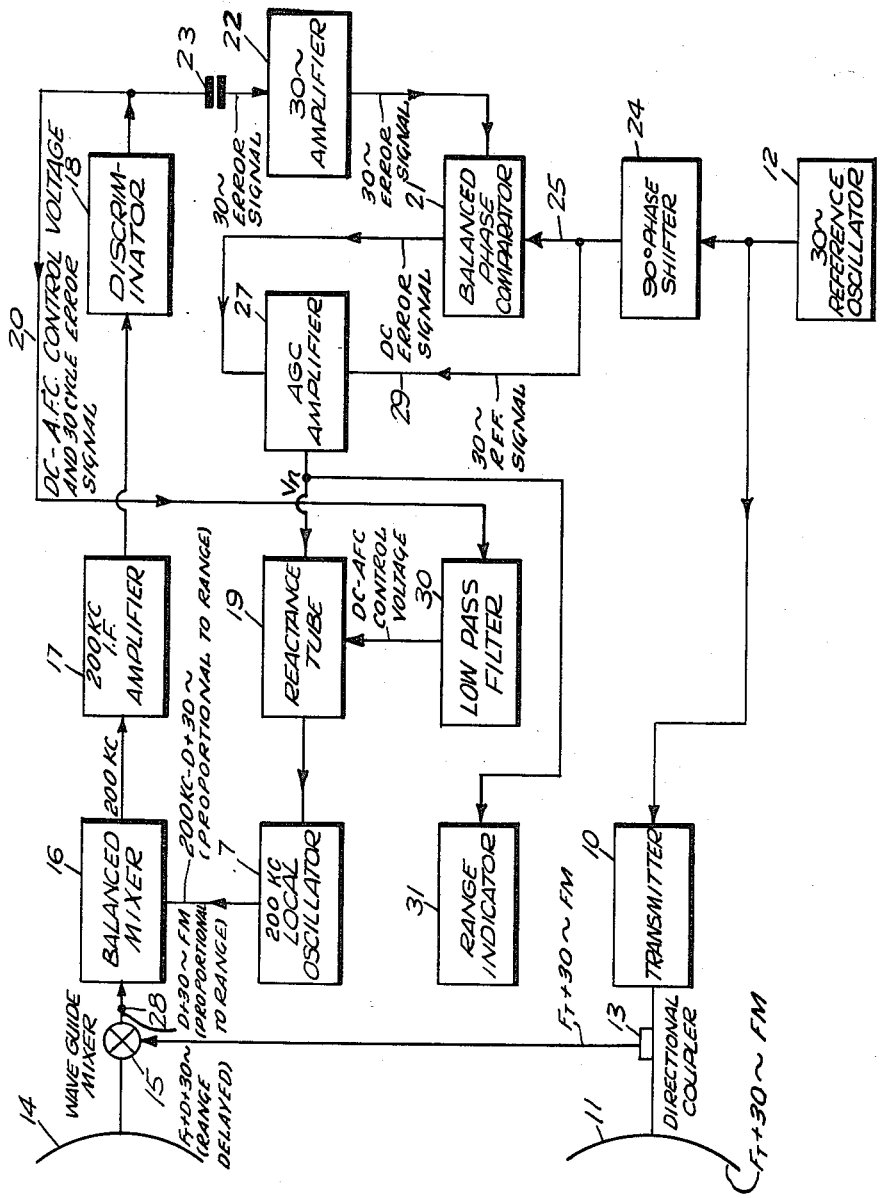

This invention relates to distance measuring systems and more particularly to continuous wave radar ranging systems of the frequency modulated type.

In ranging systems in which Doppler signals are received from the reflecting surface of a target in response to the impingement of the frequency modulated transmitted signals thereon, it is often difficult to measure range to the target through bursts of background noise or changes of signal-to-noise ratio. This is particularly true in ranging applications in which a frequency modulated Doppler shifted signal is compared with a frequency modulated transmitted signal to obtain a frequency modulated difference signal, the deviation being proportional to range. In certain applications, a control voltage is obtained which is related to this frequency deviation. This control voltage is used to control the magnitude of an alternating current voltage for the operation of a servo system or high gain amplifier in order to null to zero the deviation due to frequency modulation of the carrier. When the deviation in the received signal is nulled by said control signal rather than by changing the deviation of the transmitting magnetron, as in another nulling method, the variation of the input signal required to maintain a null is a linear function of target range. However, where magnetron nulling is used, the variation of the reflected input signal is proportional to the reciprocal of the square of the range to the target and this input signal requires the transmitter deviation to approach infinity for close in targets. It is therefore desirable to provide a relatively simple frequency modulated ranging system which is capable of maintaining a continuous range indication independent of signal-to-noise ratio and in which the theoretical limit on minimum range is removed.

In accordance with the invention, therefore, the frequency modulated and Doppler shifted carrier or return signal in a continuous wave ranging system is fed to a waveguide mixer to which is also fed a portion of the energy from the transmitter to produce a Doppler signal containing frequency modulation proportional to range and ninety degrees out of phase with the transmitted modulation. The frequency modulated Doppler signal is then heterodyned with a local oscillator signal which is frequency modulated with the ranging or reference frequency to produce a frequency modulated difference signal. This difference signal is fed to a discriminator which operates as a sensing element in a closed loop nulling circuit rather than as an amplitude measuring device. The alternating current output of the discriminator is compared with the reference signal and is used to control the magnitude of the frequency modulation applied to the local oscillator heterodyning signal. This signal frequency modulates the local oscillator and is in the form of a null-buckoff voltage proportional to range. In particular, the discriminator is used as the sensing element of a high gain closed loop which is closed around a reactance-tube controlled local oscillator by way of an alternating current to direct current converter which controls the frequency modulation of said local oscillator. In this manner a high gain loop is formed by the discriminator, the reactance tube and local oscillator to maintain the null of the frequency modulated deviation at the discriminator. With this arrangement, the maximum change in loop gain for maximum to minimum signal-to-noise is only six decibels, which is negligible to a high gain system of this type. The closed loop nulling arrangement, therefore, provides a simple method of measuring range independent of the signal-to-noise ratio.

Further advantages and features of the invention will become apparent as the description thereof progresses, reference being made to the accompanying drawing wherein the single figure is a schematic diagram of a continuous range ranging system incorporating one embodiment of the invention.

The numeral 10 refers to a transmitter incorporating a magnetron or other source of microwave energy propagated by a transmitting antenna 11 by way of a directional coupler 13. The frequency of the energy generated by the transmitter 10 is frequency modulated by signals from a 30 cycle sine wave reference oscillator 12 which controls the period of modulation in the usual manner. The frequency modulated transmitter signal, $F_t$, is radiated by the antenna 11 toward a reflecting surface or target, not shown, and is reflected back from said surface to be received by receiving antenna 14 mounted adjacent to the transmitting antenna 11. A reference oscillator frequency of 30 cycles is selected in order to provide a wavelength which is long compared to the maximum range of the radar. The signal received by antenna 14 is reduced in frequency to the Doppler beat or difference frequency D, which includes the range frequency deviation (30 cycle FM proportional to range) by a waveguide mixer 15 which is fed with a portion of the transmitted energy from directional coupler 13. The Doppler output $D+FM$ (proportional to range) of the waveguide mixer is fed into a balanced mixer 16 which is connected to a local oscillator 7 tuned to a frequency which is high compared to the Doppler frequency and the frequency of the reference oscillator, for example, 200 kilocycles. The Doppler output signal modulated by the range delayed 30 cycle signal from the crystal waveguide mixer 15 is fed to the balanced mixer 16 where it is compared or heterodyned with the local oscillator signal to produce a frequency modulated difference signal, 200 kc.$-D$. This frequency modulated difference signal is due to the heterodyning of the Doppler return signal, D, with the local oscillator frequency. This Doppler difference signal which contains the frequency modulation deviation proportional to range is fed to an intermediate frequency amplifier 17 of the broad band type. The output of the intermediate frequency amplifier is then fed to a discriminator 18 which may be the existing discriminator of a frequency modulation system. The direct current output of the discriminator, D.C. AFC control voltage is used as a conventional automatic frequency control voltage to adjust the local oscillator to a preset intermediate frequency from the Doppler signal by means of a reactance tube 19. The discriminator output is fed to the reactance tube by way of conductor 20 and a low pass or signal frequency rejection filter 30 to prevent the ranging frequency reaching the reactance tube through this path. The reactance tube 19 may be of the type disclosed in the copending application, Serial No. 630,722 of Royden C. Sanders, Jr. and William R. Mercer, filed December 24, 1156. The discriminator 18 is of the well-known Foster-Seeley type, as is illustrated, for example, in United States Patent No. 2,121,103, where this discriminator is part of a frequency modulation receiver. In this manner, the local oscillator 7 tracks the Doppler signal entering the balanced mixer by means of the automatic frequency control circuit 20 which changes the shunt reactance of the reactance tube 19. The intermediate or difference frequency output, therefore, has the same frequency modulation as the Doppler difference signal from the balanced mixer 16 and operation is similar to that of the well-known superheterodyne receiver.

In accordance with the present invention, however, the frequency modulated deviation due to target range is nulled out in a separate high gain circuit. An alternating current output, 30 cycle error signal is coupled from the discriminator 18 to a balanced phase comparator 21 by way of a 30 cycle amplifier 22 and a suitable coupling capacitor 23. The 30 cycle frequency modulation of the Doppler shifted carrier, after modulation, is amplified as an error signal in the 30 cycle amplifier 22 and fed to the balanced phase comparator 21. Also feeding this comparator is the 30 cycle output of reference oscillator 12 by way of a conventional ninety degree phase shifter 24 and conductor 25. This ninety degree leading phase shifter may be in the form of an RC circuit and compensates for the phase shift lag which normally occurs when the transmitted and received sine wave signals are compared in waveguide mixer 15. This assumes the target is approaching. However, it should be understood that any signal from a coherent radar containing frequency modulated and Doppler components, as from a pulse Doppler or continuous wave radar system, may be introduced into balanced mixer 16 at point 28. In this instance the directional coupler 13 and waveguide mixer 15 may be omitted as not forming part of the invention. The 30 cycle error signal input from amplifier 22 is phase compared with the 30 cycle reference oscillator signal, and the direct current error signal output being proportional to the alternating current input from the 30 cycle error amplifier. In this manner, the phase comparator operates as an alternating current to direct current converter to convert the frequency modulation deviation or range error signal from the discriminator to a direct current error signal to contol the amplitude of the output of an automatic gain control amplifier 27. The phase comparator 21 is of the type shown in the Theory of Servomechanisms by James, Nichols and Phillips in the Radiation Laboratory Series, vol. 25, page 112, published by McGraw-Hill, 1947. The alternating current output of the Automatic Gain Control amplifier is a nulling voltage, $V_n$, the amplitude of which is a function of range. This amplifier is a conventional type adapted to change its output substantially proportional to the direct current input signal from the balanced phase comparator. Also feeding the AGC amplifier is the 30 cycle reference voltage from reference oscillator 12 by way of conductor 29 and phase shifter 24. The output of the AGC amplifier, as noted, is a nulling voltage, the amplitude of which is controlled by the direct current output from the balanced phase comparator 21. This null voltage which, as noted, is proportional to range is fed to a range indicator 31. It is also fed to the reactance tube 19 to null out at the balanced mixer 16 the frequency modulation deviation, 30 cycle FM (range delayed) on the Doppler carrier due to the distance to the reflective surface.

In operation, therefore, the frequency modulated deviation or shift of the Doppler carrier, prior to operation of the nulling voltage, appears as a discriminator voltage output from discriminator 18 and is fed by way of a closed loop circuit including phase comparator 21, AGC amplifier 27 and reactance tube 19 to null out the frequency modulation deviation. The magnitude of modulation voltage required to achieve null is then a direct measure of the range to the reflecting surface or target. By nulling the frequency modulation deviation at the balanced mixer in this manner, the indicated range is independent of the signal-to-noise ratio. This is because the change in the gain of the discriminator is only 2 to 1 and the high gain nulling loop provides a gain of approximately 500. As a result, the change in gain at the discriminator due to noise has a negligible effect upon range accuracy. Thus, the reactance tuned local oscillator 7 locks on a Doppler signal, D, entering the balanced mixer 16 to maintain a constant intermediate frequency, 200 kc., by well-known AFC action. However, the frequency modulation deviation between the reference oscillator 12 and the output of the 30 cycle amplifier produces a direct current input signal to AGC amplifier 27, the level of said input signal being a measure of range.

It should be understood that since the AGC amplifier provides a variable output as a function of range, a servomotor and accompanying shaft driven potentiometer may be substituted therefor. Indeed any device may be used which is adapted to change its output substantially proportional to the direct current input signal from the balanced phase comparator 21. In addition, since the rereceiver is nulled, rather than the transmitter, the theoretical limit upon minimum range is removed. Moreover, maximum magnetron deviation is constant and is determined by required range resolution rather than by minimum range. In this manner, the accuracy of the range indication is increased by this closed loop nulling arrangement in a superheterodyne receiver which measures the voltage required to null the range deviation to zero.

This invention is not limited to the particular details of construction, materials and processes described, as many equivalents will suggest themselves to those skilled in the art. Accordingly, it is desired that this invention not be limited to the particular details of the embodiment disclosed herein except as defined by the appended claims. The term "frequency modulation" is intended to include "phase modulation."

What is claimed is:

1. A radar system comprising a frequency modulated transmitter for radiating frequency modulated signals to a reflecting surface, a mixer fed by signals reflected from said surface, a local oscillator energizing said mixer to produce mixing of the reflected signals and the oscillator signals, reactance means for cyclically varying the frequency of said local oscillator, a bandpass amplifier fed by the output of said mixer, a frequency discriminator fed by said amplifier, said discriminator adapted to produce a range error signal, a phase comparator fed by said range error signal and energized by a reference signal synchronized with the frequency at which said transmitter is varied in frequency, said phase comparator producing a direct current output signal proportional to said range error signal, amplifying means fed by said phase comparator and said reference oscillator to produce a null output voltage which varies in amplitude substantially proportional to said range error signal, and means feeding said null output voltage to said reactance means to cancel said range error signal.

2. A radar system comprising a frequency modulated transmitter for radiating frequency modulated signals to a reflecting surface, means for receiving signals reflected from said surface, a mixer fed by said received signals, a local oscillator energizing said mixer to produce mixing of the received signals and the oscillator signals, reactance means for cyclically varying the frequency of said local oscillator, a bandpass amplifier fed by the output of said mixer, a frequency discriminator fed by said amplifier, said discriminator adapted to produce a range error signal, a phase comparator fed by said range error signal and energized by a reference signal synchronized with the frequency at which said transmitter is varied in frequency, said phase comparator producing a direct current output proportional to said range error signal, amplifying means fed by said phase comparator and said reference signal to produce a null output voltage which varies in amplitude substantially proportional to said range error signal, means feeding said null output voltage to said reactance means to cancel said range error signal, and means responsive to said null output voltage to indicate a change in distance between said reflecting surface and said transmitter.

3. A radar system comprising a frequency modulated transmitter for radiating frequency modulated signals to a reflecting surface, means for receiving signals reflected from said surface, a mixer fed by said received signals, a local oscillator energizing said mixer to produce mixing of the received signals with the oscillator signals, reactance means for cyclically varying the frequency of said local oscillator, a bandpass amplifier fed by the output of said mixer, a frequency discriminator fed by said amplifier, said discriminator adapted to produce a range error signal, a phase comparator fed by said range error signal and energized by a reference signal synchronized with the frequency at which said transmitter is varied in frequency, said phase comparator producing a direct current output proportional to said range error signal, amplifying means fed by said phase comparator and said reference signal to produce a null output voltage which varies in amplitude substantially proportional to said range error signal, means feeding said null output voltage to said reactance means to cancel said range error signal, and means for applying the direct current output of said discriminator to said reactance means to track the Doppler frequency shift of said received signal.

4. A frequency modulated radar system comprising means for transmitting frequency modulated signals to a moving reflecting surface, means for mixing signals from said reflecting surface with a portion of said transmitted signals to provide a frequency modulated Doppler signal, a receiver having a local oscillator of the reactance type tuned to a predetermined frequency difference from said Doppler frequency signal, said receiver including a mixer fed by said frequency modulated Doppler signals from said reflecting surface, said local oscillator energizing said mixer to produce a frequency modulated difference frequency signal, means for amplifying and feeding said difference frequency signal to a discriminator adapted to operate as a sensing element to produce an alternating current range error signal, an alternating current to direct current conversion device comprising a phase comparator fed by said range error signal and energized by a reference signal synchronized with a frequency with which said transmitter is varied in frequency, said phase comparator providing a direct current output proportional to said range error signal, an automatic gain control amplifier fed by the output of said phase comparator and said reference signal to provide a null output voltage which varies proportional to said range error signal, and means feeding said null output voltage to said local oscillator to null out the range error signal at said mixer.

5. A radar system comprising a frequency modulated transmitter adapted to radiate frequency modulated signals to a reflecting surface moving with respect to said frequency-modulated transmitter, a mixer fed by said signals reflected from said surface and containing Doppler shifted frequency components, a local oscillator energizing said mixer to produce a frequency modulated difference signal in response to said Doppler shifted frequency components, a discriminator adapted to produce a control voltage in response to said difference signal, and a high gain circuit interposed between said discriminator and said local oscillator responsive to said control voltage to null out the frequency modulated difference signal which is proportional to the distance between said transmitter and said reflecting surface.

6. A radar system comprising a frequency modulated transmitter adapted to radiate frequency modulated signals to a moving reflecting surface, a mixer fed by Doppler frequency signals reflected from said surface, a local oscillator energizing said mixer to produce a beat frequency difference signal, a reactance tube adapted to vary said local oscillator over a predetermined frequency band, a closed loop circuit including a discriminator adapted to produce a control voltage in response to said difference signal, a phase comparator fed by a signal synchronized to said transmitter frequency to produce direct current error signal, and an amplifier responsive to said direct current error signal to change the shunt reactance of said reactance tube in a manner adapted to null out said beat frequency difference signal.

7. A radar system comprising a frequency modulated transmitter adapted to radiate frequency modulated signals to a moving reflecting surface, a mixer fed by reflected signals from said surface containing Doppler and frequency modulated components, a local oscillator energizing said mixer to produce a beat frequency difference signal, a reactance tube adapted to vary said local oscillator over a predetermined frequency band, a closed loop nulling circuit including a discriminator adapted to produce a control voltage in response to said difference signal, a phase comparator fed by a signal synchronized to said transmitter frequency to produce direct current error signal, and an automatic gain control amplifier responsive to said direct current error signal to produce an alternating current null voltage proportional to range, said reactance tube responsive to said null voltage to change the shunt reactance applied to said local oscillator, thereby to null out said control voltage, and indicating means responsive to said null voltage to indicate a change in distance between said reflecting surface and said transmitting means.

8. A radar system comprising a frequency modulated transmitter adapted to radiate frequency modulated signals to a reflecting surface, a mixer fed by signals reflected from said surface, a local oscillator energizing said mixer to produce a beat frequency difference signal, a reactance tube adapted to vary said local oscillator over a predetermined frequency band, a closed loop circuit including a discriminator adapted to produce a control voltage in response to said difference signal, a phase comparator fed by a signal synchronized to said transmitter frequency to produce direct current error signal, an amplifier responsive to said direct current error signal to change the shunt reactance of said reactance tube in a manner adapted to null out said beat frequency difference signal, and an automatic frequency control circuit utilizing the direct current output voltage of said discriminator to lock said local oscillator to the Doppler frequency components in said reflected signals.

9. A radar system comprising a frequency modulated transmitter adapted to radiate frequency modulated signals to a reflecting surface, a mixer fed by said signals reflected from said surface, a local oscillator energizing said mixer to produce a beat frequency difference signal, a reactance tube adapted to vary said local oscillator over a predetermined frequency band, a closed loop circuit including a discriminator adapted to produce a control voltage in response to said difference signal, a phase comparator fed by a signal synchronized to said transmitter frequency to produce direct current error signal, an amplifier responsive to said direct current error signal to change the shunt reactance of said reactance tube in a manner adapted to null out said beat frequency difference signal, an automatic frequency control circuit utilizing the direct current output voltage of said discriminator to lock said local oscillator to the Doppler frequency components in said reflected signals, and indicating means responsive to the output of said amplifier to indicate the range to said reflecting surface.

References Cited by the Examiner
UNITED STATES PATENTS

| | | | |
|---|---|---|---|
| 1,756,462 | 4/30 | Jenkins | 343—12 |
| 2,544,293 | 3/51 | Braden | 343—14 |
| 3,054,102 | 9/62 | Wright et al. | 343—14 |

OTHER REFERENCES

"Principles of FM Radar" (Wolff and Luck), RCA Review, March 1948, vol. IX, No. 1, pp. 50 to 75.

CHESTER L. JUSTUS, *Primary Examiner*.

KATHLEEN H. CLAFFY, FREDERICK M. STRADER, *Examiners*.